(12) United States Patent
Kageyama (10) Patent No.: US 8,504,243 B2
(45) Date of Patent: Aug. 6, 2013

(54) VEHICULAR STEERING APPARATUS AND CONTROL METHOD THEREOF

(75) Inventor: Hiromitsu Kageyama, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 406 days.

(21) Appl. No.: 12/999,332

(22) PCT Filed: Jul. 21, 2009

(86) PCT No.: PCT/IB2009/006301
§ 371 (c)(1),
(2), (4) Date: Dec. 16, 2010

(87) PCT Pub. No.: WO2010/010441
PCT Pub. Date: Jan. 28, 2010

(65) Prior Publication Data
US 2011/0106382 A1 May 5, 2011

(30) Foreign Application Priority Data
Jul. 22, 2008 (JP) .................................. 2008-188150

(51) Int. Cl.
*B62D 6/00* (2006.01)
(52) U.S. Cl.
USPC .................. 701/41; 701/42; 701/72; 180/6.2; 180/6.44; 180/234; 180/411; 280/91.1; 280/93.501
(58) Field of Classification Search
None
See application file for complete search history.

(56) References Cited

U.S. PATENT DOCUMENTS

| 5,018,594 | A | * | 5/1991 | Takahashi et al. ............ 180/412 |
| 5,379,218 | A | | 1/1995 | Jacobi et al. |
| 5,561,603 | A | * | 10/1996 | Goto .............................. 701/41 |
| 5,941,338 | A | * | 8/1999 | Miller et al. .................. 180/421 |
| 6,144,908 | A | | 11/2000 | Yasuda |

(Continued)

FOREIGN PATENT DOCUMENTS

| DE | 39 42 494 | 7/1990 |
| EP | 0 529 258 | 3/1993 |
| JP | 60 191876 | 9/1985 |
| JP | 01 172071 | 7/1989 |

(Continued)

OTHER PUBLICATIONS

International Search Report issued Oct. 20, 2009 in PCT/IB09/006301 filed Jul. 21, 2009.

*Primary Examiner* — Thomas Tarcza
*Assistant Examiner* — Richard Goldman
(74) *Attorney, Agent, or Firm* — Oblon, Spivak, McClelland, Maier & Neustadt, L.L.P.

(57) ABSTRACT

An electronic control unit determines that a vehicle is traveling in a straight line if a state in which the steering torque is less than a predetermined steering torque and an amount of change in the steering angle is less than a predetermined steering angle continues for a predetermined period of time when the vehicle speed is greater than a predetermined vehicle speed. Also, if the steering angle of the steering wheel is not 0, while the vehicle is traveling in a straight line, the electronic control unit calculates the steering amount of rear wheels that matches the steering amount of front wheels, using the steering angle of the steering wheel. Then the electronic control unit steers the rear wheels by driving an electric motor until a controlled neutral steering position of the rear wheels that corresponds to the steering amount matches an absolute neutral steering position.

4 Claims, 3 Drawing Sheets

U.S. PATENT DOCUMENTS

| | | | |
|---|---|---|---|
| 6,736,236 B2 * | 5/2004 | Kurishige et al. | 180/446 |
| 8,068,954 B2 * | 11/2011 | Higashi et al. | 701/43 |
| 2003/0033064 A1 * | 2/2003 | Amberkar et al. | 701/41 |
| 2004/0040781 A1 * | 3/2004 | Fujioka et al. | 180/446 |
| 2009/0112406 A1 * | 4/2009 | Fujii et al. | 701/42 |
| 2009/0143941 A1 * | 6/2009 | Tarasinski et al. | 701/41 |

FOREIGN PATENT DOCUMENTS

| | | |
|---|---|---|
| JP | 2003 276635 | 10/2003 |
| JP | 2006 103390 | 4/2006 |

* cited by examiner

VEHICULAR STEERING APPARATUS AND CONTROL METHOD THEREOF

BACKGROUND OF THE INVENTION

1. Field of the Invention

The invention relates to a vehicular steering apparatus that includes a steering wheel that is operated by a driver, a front wheel steering mechanism that steers front wheels in response to an operation of the steering wheel, and a rear wheel steering mechanism that steers rear wheels in connection with the steering of the front wheels, as well as to a control method of that vehicular steering apparatus.

2. Description of the Related Art

In a four-wheel steered vehicle in which both the front wheels and rear wheels are able to be steered, the steering direction of the front and rear wheels must be pointed in the front-rear axial direction of the vehicle body in order to make the vehicle travel in a straight line while the front-rear axial direction of the vehicle body is aligned with the direction in which the vehicle is traveling. That is, when the operating position of the steering wheel that is operated by a driver is the neutral position, the steering direction of the front and rear wheels must be pointed in the front-rear axial direction of the vehicle body corresponding to this neutral position of the steering wheel. Therefore, in order to have the vehicle travel in a straight line while the front-rear axial direction of the vehicle body is aligned with the direction in which the vehicle is traveling, it is necessary to appropriately determine whether the vehicle is traveling in a straight line, and align the steering direction of the front and rear wheels with the front-rear axial direction of the vehicle body based on this determination.

Regarding this determination of straight-line travel of a vehicle, Japanese Patent Application Publication No. 2006-103390 (JP-A-2006-103390), for example, describes technology in which it is determined that a vehicle is traveling in a straight line when three conditions continue to be satisfied for a predetermined period of time. The three conditions are i) that the amount of change in the steering angle detected by a steering angle sensor be within a predetermined small amount of change, ii) that the vehicle speed detected by a vehicle speed sensor be equal to or greater than a predetermined vehicle speed, and iii) that the axial force applied to a rack bar be within a predetermined small range.

Also, regarding this determination of straight-line travel of a vehicle, Japanese Patent Application Publication No. 2003-276635 (JP-A-2003-276635), for example, describes technology in which it is determined that a vehicle is traveling in a straight line if i) the wheel speed of each wheel is greater than zero, ii) the wheel speeds of the left and right wheels are substantially the same, and iii) the steering torque is substantially zero.

Incidentally, in a four-wheel steered vehicle, even if the rear wheels are being steered slightly, the vehicle can still be driven in a straight line while the front-rear axial direction of the vehicle body is at a slight angle with respect to the direction in which the vehicle is traveling, by the driver operating the steering wheel and steering the front wheels in accordance with the rear wheels. However, in order to drive the vehicle, in a straight line in this way, the steering wheel must be held in an operating position that is different from the neutral position, i.e., the steering wheel must be held off-center. As a result, the driver feels the odd sensation that the neutral position of the steering wheel is offset even though the vehicle is traveling in a straight line. Therefore, it is necessary to correct the offset in the neutral position of the steering wheel that may occur in a four-wheel steered vehicle, i.e., it is necessary to correct the off-centerness of the steering wheel.

SUMMARY OF THE INVENTION

This invention thus provides a vehicular steering apparatus that corrects an offset in a neutral position of a steering wheel that may occur in a vehicle in which both front and rear wheels are able to be steered, as well as a control method of that vehicular steering apparatus.

A first aspect of the invention relates to a vehicular steering apparatus that includes a steering wheel which is operated by a driver, a front wheel steering mechanism which steers a front wheel in response to an operation of the steering wheel, and a rear wheel steering mechanism which steers a rear wheel in connection with the steering of the front wheel. The vehicular steering apparatus also includes vehicle speed detecting means for detecting the speed of a vehicle; operating force detecting means for detecting operating force applied to the steering wheel; displacement amount detecting means for detecting the amount of displacement of the steering wheel; straight-line travel determining means for determining that the vehicle is traveling in a straight line when a state in which i) the operating force detected by the operating force detecting means is equal to or less than a predetermined operating force that is set in advance and ii) an amount of change in the amount of displacement detected by the displacement amount detecting means is equal to or less than a predetermined amount of change that is set in advance, continues for a predetermined period of time that is set in advance or longer, when the vehicle speed detected by the vehicle speed detecting means is equal to or greater than a predetermined vehicle speed that is set in advance; operating position determining means for determining whether the operating position of the steering wheel that corresponds to the amount of displacement of the steering wheel detected by the displacement amount detecting means is different than a neutral position of the steering wheel for aligning the direction in which the vehicle is traveling with the front-rear axial direction of a vehicle body such that the vehicle will travel in a straight line, when it is determined by the straight-line travel determining means that the vehicle is traveling in a straight line; and operating position correcting means for correcting the operating position of the steering wheel to the neutral position when it is determined by the operating position determining means that the operating position of the steering wheel is different than the neutral position.

In this case, the rear wheel steering mechanism may include an actuator for steering the rear wheel, and steering amount detecting means for detecting a relative steering amount of the rear wheel with respect to the vehicle body from driving the actuator. The operating position correcting means may be constructed with i) rear wheel steering amount calculating means for calculating a steering amount of the rear wheel that matches the steering amount of the front wheel, using the amount of displacement of the steering wheel detected by the displacement amount detecting means and a ratio between the amount of displacement of the steering wheel in the front wheel steering mechanism and the steering amount of the front wheel, and ii) actuator operation controlling means for operating the actuator, using the relative steering amount detected by the steering amount detecting means, until the steering position of the rear wheel that corresponds to the steering amount calculated by the rear wheel steering amount calculating means comes to match a neutral steering position for aligning the direction in which the vehicle is traveling with the front-rear axial direction of the vehicle body such that the vehicle travels in a straight line.

Also in this case, a first shaft that is connected to the steering wheel may be able to rotate relative to a second shaft that is connected to the front wheel steering mechanism. Also, a front wheel steering actuator may be provided which independently displaces the steering wheel with respect to the steering of the front wheel, and the operating position correcting means may correct the operating position of the steering wheel to the neutral position by controlling the operation of the front wheel steering actuator when it is determined by the straight-line travel determining means that the vehicle is traveling in a straight line and it is determined by the operating position determining means that the operating position of the steering wheel is different than the neutral position.

Accordingly, if the vehicle is traveling in a straight line and it is determined that the steering wheel is off-center, which may occur in a four-wheel steered vehicle in which both the front and rear wheels can be steered, that off-centerness of the steering wheel can be corrected. More specifically, first it is determined that the vehicle is traveling in a straight line if a state in which i) the detected operating force is equal to or less than the predetermined operating force that is set in advance and ii) the amount of change in the detected amount of displacement is equal to or less than the predetermined amount of change that is set in advance, continues for a predetermined period of time, which is set in advance, or longer when the detected vehicle speed is equal to or greater than a predetermined vehicle speed that is set in advance. As a result, it is possible to accurately determine by a simple structure whether the vehicle is traveling in a straight line.

Then it is possible to determine whether the steering wheel is off-center by determining whether the operating position of the steering wheel that corresponds to the amount of displacement of the steering wheel is different than a neutral position of the steering wheel that causes the vehicle to travel in a straight line while the front-rear axial direction of the vehicle body is aligned with the direction in which the vehicle is traveling, while the vehicle is traveling in a straight line. If it is determined that the steering wheel is off-center, the operating position of the steering wheel can be corrected by returning the steering wheel to the neutral position that coincides with the senses of the driver, i.e., the off-centerness of the steering wheel can be corrected, so that it does not feed odd to the driver.

Incidentally, when the four-wheel steered vehicle is traveling in a straight line with the steering wheel off-center, the vehicle travels in a straight line with the front-rear axial direction of the vehicle body at a slight angle to the direction of travel, and the steering amount of the front wheels matches the steering amount of the rear wheels. Therefore, the operating position of the steering wheel is corrected by calculating the steering amount of the front wheel, i.e., the steering amount of the rear wheel, using the amount of displacement of the steering wheel and the ratio between the amount of displacement of the steering wheel in the front wheel steering mechanism and the steering amount of the front wheel, and then steering the rear wheel using an actuator until the steering position of the rear wheel that corresponds to the calculated steering amount comes to match a neutral steering position that causes the vehicle to travel in a straight line while the front-rear axial direction of the vehicle body is aligned with the direction in which the vehicle is traveling.

That is, in order to make the vehicle travel in a straight line when the rear wheel has been steered to the neutral steering position, the front wheel must be steered to a steering position (i.e., a front wheel neutral steering position) that corresponds to the neutral steering position of the rear wheel. Steering the front wheel to the neutral steering position in this case is done by returning the operating position of the steering wheel to the neutral position. Therefore, the off-centerness of the steering wheel can be corrected by steering the rear wheel to the neutral steering position. As a result, the vehicle is able to travel in a straight line and it will not feel odd to the driver.

Also, a four-wheel steered vehicle can still be driven in a straight line even if the front-rear axial direction of the vehicle body is at a slight angle to direction in which the vehicle is traveling. Therefore, when the first shaft that is connected to the steering wheel and the second shaft that is connected to the front wheel steering mechanism are able to rotate relative to one another, and an actuator which independently displaces the steering wheel with respect to the steering of the front wheel is provided in the vehicular steering apparatus, it is also possible to correct the operating position of the steering wheel by returning the steering wheel to the neutral position, which is done by controlling the actuator, without steering the front and rear wheels. In this case, even though strictly speaking the vehicle travels in a straight line while the front-rear axial direction of the vehicle is at a slight angle to the direction in which the vehicle is traveling, this angle is small compared to the amount of displacement according to the off-centerness of the steering wheel. Therefore, correcting this off-centerness of the steering wheel will eliminate the odd sensation that the driver may otherwise feel.

A second aspect of the invention relates to a control method for a vehicular steering apparatus that includes a steering wheel which is operated by a driver, a front wheel steering mechanism which steers a front wheel in response to an operation of the steering wheel, and a rear wheel steering mechanism which steers a rear wheel in connection with the steering of the front wheel. The control method includes detecting the speed of the vehicle; detecting operating force applied to the steering wheel; detecting the amount of displacement of the steering wheel; determining, that the vehicle is traveling in a straight line when a state in which i) the detected operating force is equal to or less than a predetermined operating force that is set in advance and ii) an amount of change in the detected amount of displacement is equal to or less than a predetermined amount of change that is set in advance, continues for a predetermined period of time that is set in advance or longer, when the detected vehicle speed is equal to or greater than a predetermined vehicle speed that is set in advance; determining whether the operating position of the steering wheel that corresponds to the detected amount of displacement of the steering wheel is different than a neutral position of the steering wheel for aligning the direction in which the vehicle is traveling with the front-rear axial direction of a vehicle body such that the vehicle will travel in a straight line, when it is determined that the vehicle is traveling in a straight line; and correcting the operating position of the steering wheel to the neutral position when it is determined that the operating position of the steering wheel is different than the neutral position.

Accordingly, if the vehicle is traveling in a straight line and it is determined that the steering wheel is off-center, which may occur in a four-wheel steered vehicle in which both the front and rear wheels can be steered, that off-centerness of the steering wheel can be corrected. More specifically, first it is determined that the vehicle is traveling in a straight line if a state in which i) the detected operating force is equal to or less than the predetermined operating force that is set in advance and ii) the amount of change in the detected amount of displacement is equal to or less than the predetermined amount of change that is set in advance, continues for a predetermined period of time, which is set in advance, or longer when the detected vehicle speed is equal to or greater than a predetermined vehicle speed that is set in advance. As a result, it is possible to accurately determine by a simple structure whether the vehicle is traveling in a straight line.

Then it is possible to determine whether the steering wheel is off-center by determining whether the operating position of the steering wheel that corresponds to the amount of displacement of the steering wheel is different than a neutral position of the steering wheel that causes the vehicle to travel in a straight line while the front-rear axial direction of the vehicle body is aligned with the direction in which the vehicle is traveling, while the vehicle is traveling in a straight line. If it is determined that the steering wheel is off-center, the operating position of the steering wheel can be corrected by returning the steering wheel to the neutral position that coincides with the senses of the driver, i.e., the off-centerness of the steering wheel can be corrected, so that it does not feed odd to the driver.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Figure 1:
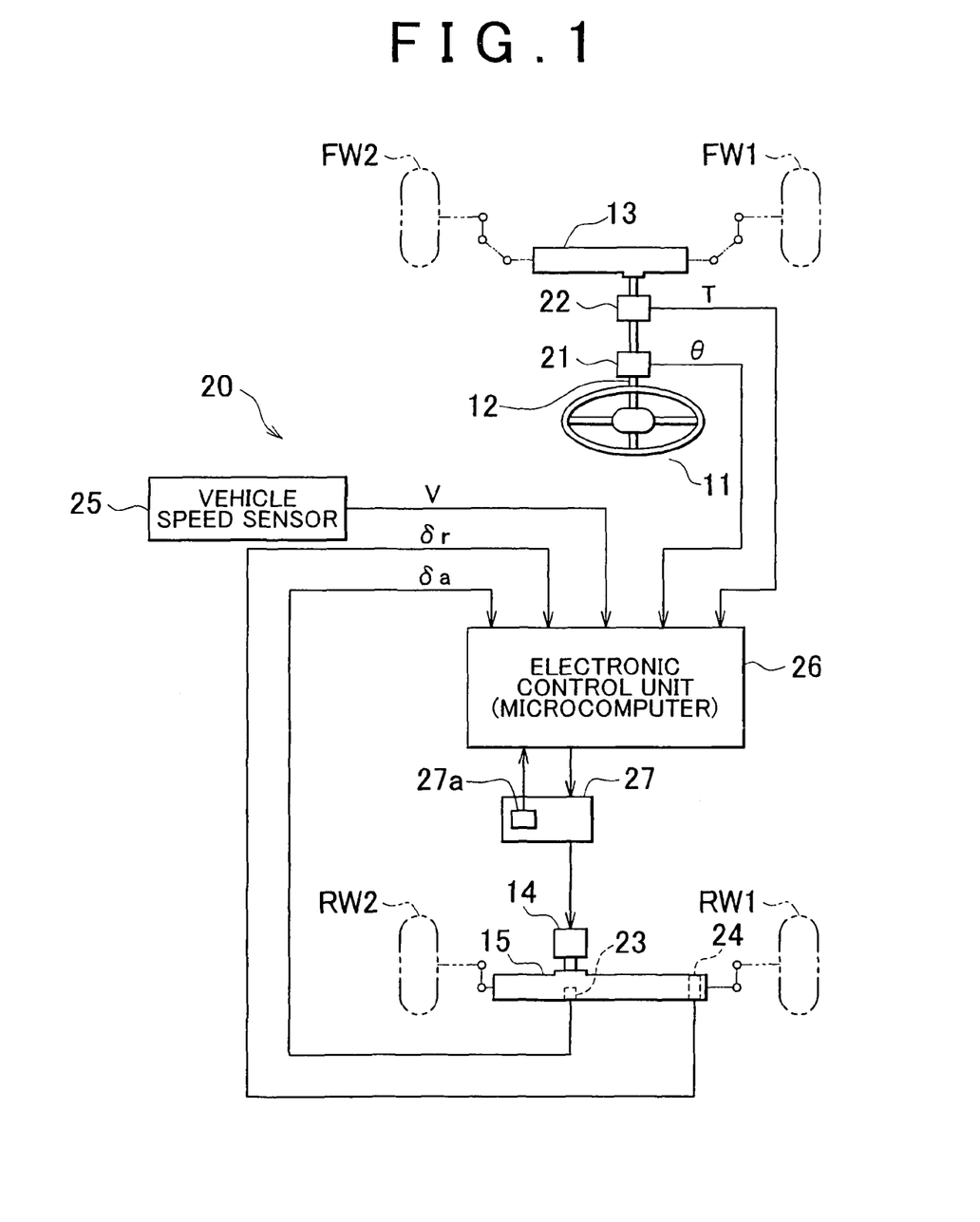
FIG. 1 is an overall schematic diagram of a vehicle provided with a vehicular steering apparatus according to an example embodiment of the invention.

Hereinafter, a vehicular steering apparatus according to an example embodiment of the invention will be described with reference to the accompanying drawings. FIG. 1 is a schematic diagram showing a vehicle provided with a vehicular steering apparatus according to an example embodiment of the invention.

This vehicular steering apparatus includes a steering wheel 11 that is turned by a driver. The steering wheel 11 is fixed to the upper end of a steering shaft 12. The lower end of the steering shaft 12 is connected to a front wheel steering mechanism 13 that includes a rack-and-pinion mechanism, as well as an assist motor that assists the driver with turning the steering wheel 11. This front wheel steering mechanism 13 converts the rotary motion of the steering shaft 12 into linear motion in the left-right direction of the vehicle such that left and right front wheels FW1 and FW2 which are connected via tie-rods and knuckle arms can be steered left and right.

This vehicular steering apparatus is also capable of steering left and right rear wheels RW1 and RW2 in connection with the steering of the left and right front wheels FW1 and FW2. Therefore, the vehicular steering apparatus includes an electric motor 14, which serves as an actuator that generates rotational driving force for steering the left and right rear wheels RW1 and RW2, and a rear wheel steering mechanism 15 that steers the left and right rear wheels RW1 and RW2 by driving that electric motor 14. The rear wheel steering mechanism 15 has a well known gear mechanism which reduces the rotation speed that has been output from the electric motor 14 and converts this slowed rotary motion into linear motion. The rear wheel steering mechanism 15 is connected to the left and right rear wheels RW1 and RW2 via toe control arms, for example.

Accordingly, the electric motor 14 is driven and the rotation that is slowed by the rear wheel steering mechanism 15 is converted into linear motion in response to the driver turning the steering wheel 11, i.e., to match the steering of the left and right front wheels FW1 and FW2. This linear motion is then transmitted to the toe control arms such that the left and right rear wheels RW1 and RW2 that are connected to the toe control arms are steered left and right.

Next, an electronic control apparatus 20 that controls the driving of the electric motor 14 will be described. This electronic control apparatus 20 includes a steering angle sensor 21, a steering torque sensor 22, a rear wheel absolute angle sensor 23, a rear wheel relative angle sensor 24 that functions as rear wheel steering amount detecting means, and a vehicle speed sensor 25.

The steering angle sensor 21 is mounted to the steering shaft 12. This steering angle sensor 21 detects the rotation angle from the operating position of the steering wheel 11 that causes the vehicle to travel in a straight line while the front-rear axial direction of the vehicle body is aligned with the direction in which the vehicle is traveling (hereinafter this operating position will be referred to as the "neutral position"), and outputs a signal indicative of this detected rotation angle as the steering angle $\theta$. Incidentally, the steering angle sensor 21 outputs a steering angle $\theta$ of 0 when the steering wheel 11 is in the neutral position (the center position). The steering torque sensor 22 is also mounted to the steering shaft 12 and outputs a signal indicative of the torque applied by the driver to the steering wheel 11 as the steering torque T. The rear wheel absolute angle sensor 23 is mounted to the rear wheel steering mechanism 15. This rear wheel absolute angle sensor 23 detects the absolute steering amount of the left and right rear wheels RW1 and RW2 with respect to the vehicle body and outputs a signal indicative of that absolute steering amount as the absolute steering angle $\delta a$. The rear wheel relative angle sensor 24 is also mounted to the rear wheel steering mechanism 15. This rear wheel relative angle sensor 24 detects the relative axial displacement of a rack bar that forms the mechanism 15 with respect to the vehicle body, and outputs a signal indicative of the relative steering amount of the left and right rear wheels RW1 and RW2 based on this detected relative axial displacement as the relative steering angle $\delta r$. The vehicle speed sensor 25 detects the vehicle speed V and outputs a signal indicative of that vehicle speed V.

Also, these sensors 21 to 25 are connected to an electronic control unit 26. This electronic control unit 26 is mainly formed of a microcomputer that includes a CPU, nonvolatile memory (such as EEPROM), volatile memory (such as RAM), and a timer and the like. The electronic control unit 26 controls the operation of the electric motor 14 by executing various programs including one which will be described later. Therefore, a drive circuit 27 for driving the electric motor 14 is connected to the output side of the electronic control unit 26. A current detector 27a for detecting the driving current flowing to the electric motor 14 is provided in the drive circuit 27. The drive current detected by this current detector 27a is fed back to the electronic control unit 26 to control the operation of the electric motor 14.

When the steering wheel 11 in a vehicle having this kind of structure is turned by the driver, this turning operation is transmitted to the front wheel steering mechanism 13 via the steering shaft 12 such that the left and right front wheels FW1 and FW2 are turned accordingly. As a result, the vehicle is able to be turned in response to the driver turning the steering wheel 11. Also, in order to improve the maneuverability of the vehicle at low speeds and make the behavior of the vehicle stable while turning at medium and high speeds, the electronic control unit 26 calculates a target steering amount (i.e., a target steering angle) of the left and right rear wheels RW1 and RW2 that matches the steering of the left and right front wheels FW1 and FW2, and controls the steering of the left and right rear wheels RW1 and RW2 to realize this target steering amount (i.e., target steering angle) by executing a program, not shown.

Here, the electronic control unit 26 drives the electric motor 14 by controlling the drive circuit 27, in order to steer the left and right rear wheels RW1 and RW2 the target steering amount (i.e., to the target steering angle). In the drive control of the electric motor 14, the electronic control unit 26 determines a reference steering position (hereinafter this reference steering position will be referred to as the "controlled neutral steering position") for steering the left and right rear wheels RW1 and RW2 using the absolute steering angle δa detected by the rear wheel absolute angle sensor 23. The electronic control unit 26 then steers the left and right rear wheels RW1 and RW2 the target steering amount (i.e., to the target steering angle) using the relative steering angle or that corresponds to the steering amount from the controlled neutral steering position detected by the rear wheel relative angle sensor 24.

Incidentally, the rear wheel absolute angle sensor 23 detects the rear wheel steering angle δa of the left and right rear wheels RW1 and RW2 when the ignition switch is turned on by the driver, for example. However, the reference for detecting the rear wheel steering angle δa, which is the absolute angle, may change depending on the previous running state of the vehicle or angle detection state. If the detection reference of the rear wheel absolute angle sensor 23 has changed, the controlled neutral steering position also changes, and as a result, the controlled neutral steering position ends up being different than the steering position that causes the left and right rear wheels RW1 and RW2 to travel in a straight line while the front-rear axial direction of the vehicle body is aligned with the direction in which the vehicle is traveling (hereinafter this steering position will be referred to as the "absolute neutral steering position"). That is, if the controlled neutral steering position is different than the absolute neutral steering position, even if the driver keeps the steering wheel 11 in a straight-line position such that the left and right front wheels FW1 and FW2 are kept in a straight-line position (i.e., a front wheel neutral steering position), the left and right rear wheels RW1 and RW2 end up being steered by the amount of offset between the controlled neutral steering position and the absolute neutral steering position.

Figure 2:
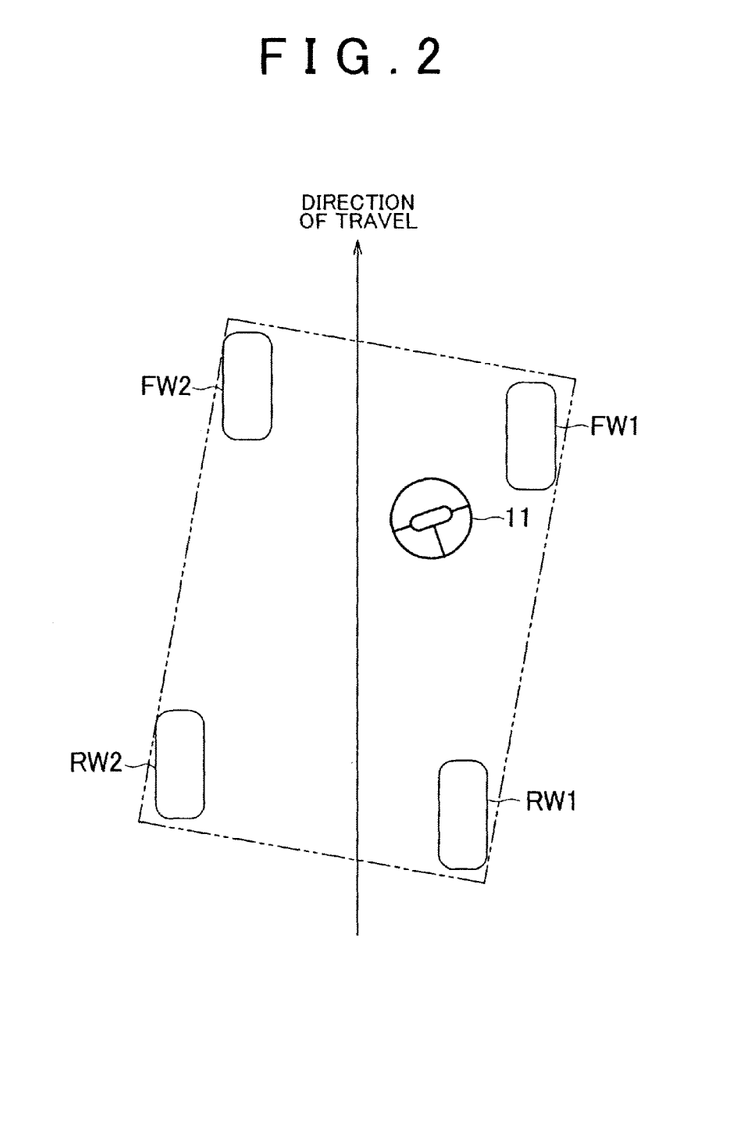
FIG. 2 is a view showing the vehicle traveling in a straight line when the controlled neutral steering position of the rear wheels is offset from the absolute neutral steering position.

Even in such a case, in a four-wheel steered vehicle (a so-called 4WS vehicle) in which both the left and right front wheels FW1 and FW2 and the left and right rear wheels RW1 and RW2 can be steered, the vehicle can be kept traveling in a straight line by the driver turning the steering wheel 11 and steering the left and right front wheels FW1 and FW2. More specifically, as shown in FIG. 2, the driver can keep the vehicle traveling in a straight line by turning the steering wheel 11 to steer the left and right front wheels FW1 and FW2 in the direction in which the vehicle is traveling, which is determined by the amount of offset between the controlled neutral steering position of the left and right rear wheels RW1 and RW2 and the absolute neutral steering position.

However, in this case, the vehicle travels in a straight line while the front-rear axial direction of the vehicle body is at a slight angle to the direction in which the vehicle is traveling (i.e., so-called "crab-walking"). That is, the steering wheel 11 is turned or off-center even though the vehicle is traveling in a straight line. When the steering wheel 11 is off-center when the vehicle is traveling in a straight line (i.e., crab-walking) in this way, it feels odd to the driver because it is different than the usual neutral position of the steering wheel 11 when the vehicle is traveling in a straight line.

Therefore, the electronic control unit 26 executes a neutral position correcting program that corrects the offset of the neutral position of the steering wheel 11, i.e., the off-centerness, by correcting the controlled neutral steering position of the left and right rear wheels RW1 and RW2 to the absolute neutral steering position. Hereinafter, this neutral position correcting program will be described in detail with reference to the flowchart shown in FIG. 3.

Figure 3:
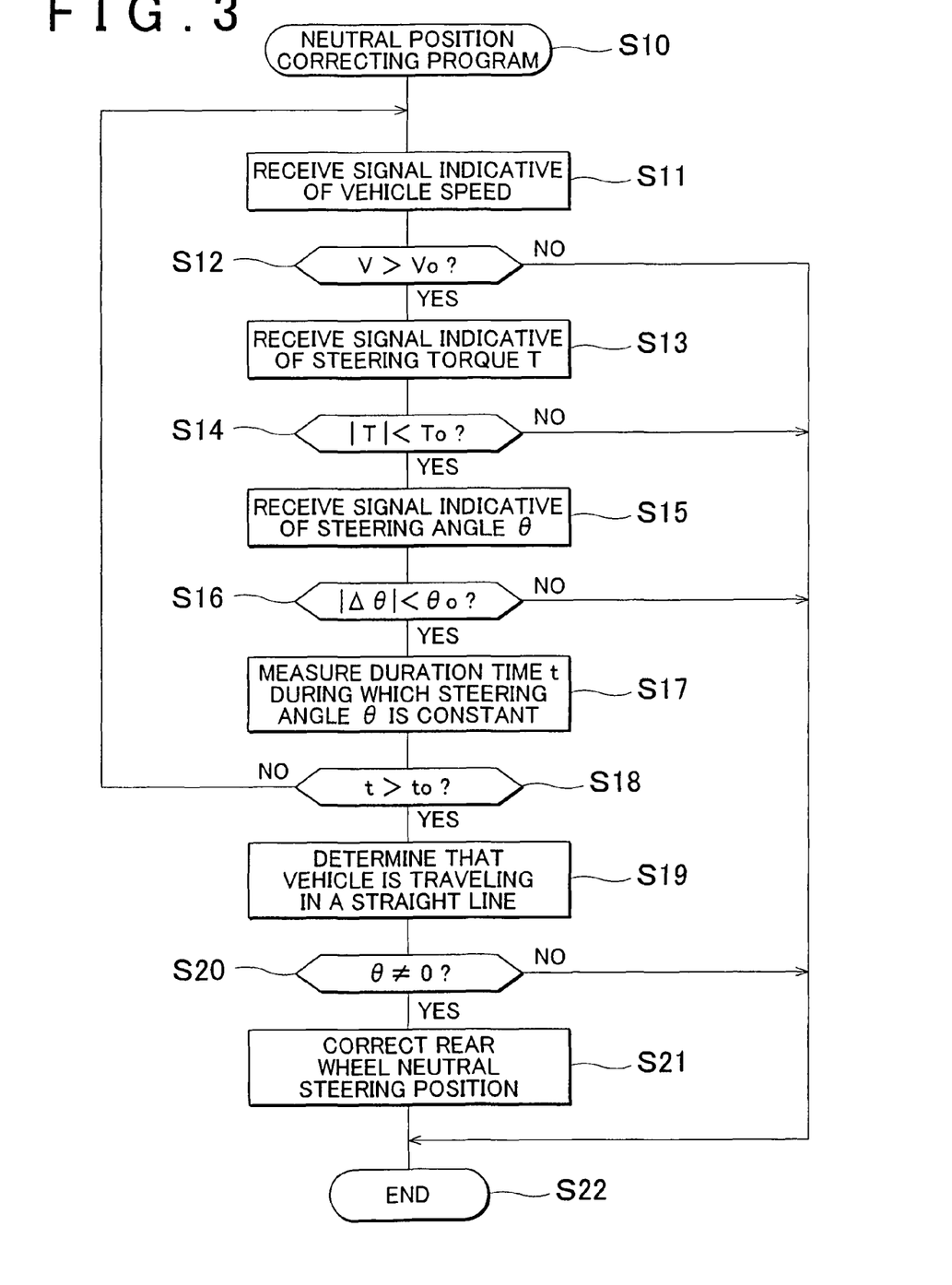
FIG. 3 is a flowchart illustrating a neutral position correcting program executed by an electronic control unit shown in FIG. 1.

When the driver turns on the ignition switch, the electronic control unit 26 starts to execute the neutral position correcting program in step S10. Then in step S11, the electronic control unit 26 receives the signal indicative of the detected vehicle speed V from the vehicle speed sensor 25, and in step S12, the electronic control unit 26 determines whether that vehicle speed V is greater than a predetermined vehicle speed Vo that is set in advance. If the detected vehicle speed V is greater than the predetermined vehicle speed Vo, the determination is yes and the process proceeds on to a straight-line determination in steps S13 and thereafter. If, on the other hand, the detected vehicle speed V is equal to or less than the predetermined vehicle speed Vo, the determination is no and the process proceeds on to step S22 where this cycle of the program ends. In this case, the program starts to be executed again in step S10 after a predetermined short period of time has passed.

In steps S13 to S19, the electronic control unit 26 determines whether the vehicle is traveling in a straight line. More specifically, in step S13 the electronic control unit 26 receives the signal indicative of the steering torque T detected by the steering torque sensor 22, and then in step S14, determines whether the absolute value of that steering torque T is less than a predetermined small torque To that is set in advance through testing. If the absolute value of that steering torque T is less than the predetermined torque To, it means that the driver is not turning the steering wheel 11 much (i.e., is basically keeping the steering wheel in one place), and the determination is yes and the process proceeds on to step S15. If, on the other hand, the absolute value of that steering torque T is equal to or greater than the predetermined torque To, it means that the driver is actively turning the steering wheel 11, and the determination is no. In this case, the process proceeds to step S22 where this cycle of the program ends in order to cancel the straight-line determination.

In step S15, the electronic control unit 26 receives the signal indicative of the steering angle θ detected by the steering angle sensor 21, after which the process proceeds on to step S16. In step S16, the electronic control unit 26 determines whether the absolute value of the amount of change Δθ ($=\theta_n-\theta_{n-1}$) between i) the steering angle θ received in step S15 in the last cycle of the neutral position correcting program (hereinafter this last steering angle will be referred to as "steering angle $\theta_{n-1}$") and ii) the steering angle θ received in step S15 in the current cycle of the neutral position correcting program (hereinafter this current steering angle will be referred to as "steering angle $\theta_n$") is less than a predetermined small steering angle θΔ that is set in advance through testing.

That is, if the absolute value of the amount of change Δθ is less than the predetermined steering angle θo, it means that the driver is not turning the steering wheel 11 much (i.e., is basically keeping the steering wheel in one place), and the determination is yes, in which case the process proceeds on to step S17. If, on the other hand, the absolute value of the amount of change Δθ is equal to or greater than the predetermined steering angle θo, it means that the driver is actively turning the steering wheel 11, and the determination is no. In this case, the process proceeds to step S22 where this cycle of the program ends in order to cancel the straight-line determination.

In step S17, the electronic control unit 26 measures the duration time t that step S16 remains satisfied, i.e., that the steering angle θ of the steering wheel 11 continues to be kept substantially constant. Then in step S18, the electronic control unit 26 determines whether the duration time t measured in step S17 is longer than a predetermined time "to" that is set in advance.

If the duration time t is longer than the predetermined time "to", it means that the driver is basically keeping the steering wheel 11 in one place for a certain amount of time or longer, and the determination is yes, in which case the process proceeds on to step S19. If, on the other hand, the duration time t is equal to or shorter than the predetermined time "to" that is set in advance, the determination is no. The electronic control unit 26 repeatedly performs steps S11 to S17 until the duration time t becomes longer than the predetermined time "to".

In step S19, the electronic control unit 26 determines that the vehicle is traveling in a straight line because the absolute value of the steering torque T is less than the predetermined torque To and the change in the steering angle θ has not changed for at least a certain period of time. Then in step S20, the electronic control unit 26 determines whether the steering angle θ received in step S15 is 0. If that steering angle θ is not 0, the determination is yes and the process proceeds on to step S21 where the electronic control unit 26 corrects the controlled neutral steering position of the left and right rear wheels RW1 and RW2 to the absolute neutral steering position. If, on the other hand, the steering angle θ received in step S15 is 0, it means that the steering wheel is not off-center, i.e., that the controlled neutral steering position of the left and right rear wheels RW1 and RW2 is already at the absolute neutral steering position, and the determination is no, in which case the process proceeds on to step S22 where this cycle of the program ends.

In step S21, the electronic control unit 26 corrects the controlled neutral steering position of the left and right rear wheels RW1 and RW2 to the absolute neutral steering position. This correction will now be described in detail.

When the controlled neutral steering position has changed due to a change in the detection reference of the rear wheel absolute angle sensor 23, it is not possible to ascertain the steering amount (i.e., the steering angle) of the left and right rear wheels RW1 and RW2, i.e., the amount of offset between the controlled neutral steering position and the absolute neutral steering position, even if the rear wheel relative angle sensor 24, which is highly accurate, is used, because the detected rear wheel steering angle δr is detected based on the controlled neutral steering position. Incidentally, in a 4WS vehicle, when the controlled neutral steering position of the left and right rear wheels RW1 and RW2 is different than absolute neutral steering position, the vehicle can be driven in a straight line by keeping the steering wheel 11 off-center to make the left and right front wheels FW1 and FW2 match the steering amount (i.e., the steering angle) of the left and right rear wheels RW1 and RW2, as described above.

Based on this, the electronic control unit 26 receives the signal indicative of the steering angle θ of the steering wheel 11 which is off-center from the steering angle sensor 21, and calculates the steering amount (i.e., the steering angle) of the left and right front wheels FW1 and FW2, i.e., the steering amount (i.e., the steering angle) of the left and right rear wheels RW1 and RW2, based on that steering angle θ. Then the electronic control unit 26 drives the electric motor 14 using the rear wheel steering angle δr from the rear wheel relative angle sensor 24 so that the calculated steering amount (i.e., the steering angle) becomes 0.

More specifically, the electronic control unit 26 calculates the steering amount (i.e., the steering angle) S of the left and right front wheels FW1 and FW2, i.e., the left and right rear wheels RW1 and RW2, according to Expression 1 below using the steering angle θ received in step S15, or more specifically, the steering angle θ of the steering wheel 11 that is off-center.

$$S = \theta/D \qquad \text{Expression 1}$$

where D represents a preset gear ratio between the rotation amount (i.e., steering angle) θ of the steering shaft 12 that rotates together with the steering wheel 11 in the front wheel steering mechanism 13, and the steering amount (i.e., steering angle) of the left and right front wheels FW1 and FW2.

The calculated steering amount (i.e., steering angle) S corresponds to the amount of offset between the absolute neutral steering position and the controlled neutral steering position when the vehicle is traveling in a straight line. Therefore, the electronic control unit 26 drives the electric motor 14 via the drive circuit 27 to steer the left and right rear wheels RW1 and RW2 until the calculated steering amount (i.e., steering angle) S becomes 0. At this time, the electronic control unit 26 receives the signal indicative of the rear wheel steering angle δr detected by the rear wheel relative angle sensor 24, which has better detection accuracy than the rear wheel absolute angle sensor 23 does, and steers the left and right rear wheels RW1 and RW2 until the calculated steering amount (i.e., the steering angle) S becomes 0. This enables the controlled neutral steering position to be corrected by aligning it with the absolute neutral steering position, so that the steering position of the left and right rear wheels RW1 and RW2 when the vehicle is traveling in a straight line can be made to match the absolute center steering position. Making the steering position of the left and right rear wheels RW1 and RW2 match the absolute center steering position enables the left and right front wheels FW1 and FW2 when the vehicle is traveling in a straight line to also be made to match the neutral steering position of the front wheels. As a result, the steering wheel 11, which is off-center, is able to be returned to the neutral position (i.e., the center).

Once the controlled neutral steering position of the left and right rear wheels RW1 and RW2 is corrected in this way, the process proceeds on to step S22 where this cycle of the program ends. The program starts to be executed again in step S10 after a predetermined short period of time has passed.

As can be understood from the above description, according to this example embodiment, if the vehicle is traveling in a straight line and it is determined that the steering wheel 11 is off-center, which may occur in a four-wheel steered vehicle in which both the left and right front wheels FW1 and FW1 and the left and right rear wheels RW1 and RW2 can be steered, that off-centerness of the steering wheel 11 can be corrected. More specifically, the electronic control unit 26 is first able to determine that the vehicle is traveling in a straight line if a state in which i) the detected steering torque T is equal to or less than the predetermined steering torque To that is set in advance and ii) the amount of change Δθ, which is indicative of the amount of change in the detected steering angle θ, is equal to or less than the predetermined steering angle θo that is set in advance, continues for a predetermined period of time "to" that is set in advance when the detected vehicle speed is equal to or greater than a predetermined vehicle speed Vo that is set in advance. As a result, it is possible to accurately determine by a simple structure whether the vehicle is traveling in a straight line.

Then the electronic control unit 26 is able to determine whether the steering wheel 11 is off-center by determining whether the steering angle θ of the steering wheel 11 is different than 0 which is indicative of a neutral position of the steering wheel 11 that causes the vehicle to travel in a straight line while the front-rear axial direction of the vehicle body is aligned with the direction in which the vehicle is traveling. If it is determined that the steering wheel 11 is off-center, the electronic control unit 26 can correct the operating position of the steering wheel 11 by returning the steering wheel 11 to the neutral position.

More specifically, when the four-wheel steered vehicle is traveling in a straight line with the steering wheel 11 off-center, the vehicle travels in a straight line with the front-rear axial direction of the vehicle body at a slight angle to the direction of travel, i.e., so-called "crab-walking", and the steering angle of the left and right front wheels FW1 and FW2 matches the steering angle of the left and right rear wheels RW1 and RW2. Therefore, the electronic control unit 26 calculates the steering amount of the left and right front wheels FW1 and FW2, i.e., the steering amount (i.e., the steering angle) S of the left and right rear wheels RW1 and RW2, according to Expression 1 above using the steering angle θ of the steering wheel 11 and the gear ratio D between the steering angle θ of the steering wheel 11 (i.e., the steering shaft 12) in the front wheel steering mechanism 13 and the steering amount (i.e., the steering angle) of the front wheels. Then the electronic control unit 26 corrects the off-centerness of the steering wheel 11 by steering the left and right rear wheels RW1 and RW2 by driving the motor 14 based on the rear wheel steering angle δr detected by the rear wheel relative angle sensor 24, until the controlled neutral steering position of the left and right rear wheels RW1 and RW2 that corresponds to the calculated steering amount (i.e., the steering angle) S comes to match the absolute neutral steering position that causes the vehicle to travel in a straight line while the front-rear axial direction of the vehicle body is aligned with the direction in which the vehicle is traveling.

That is, in order to make the vehicle travel in a straight line when the left and right rear wheels RW1 and RW2 have been steered to the absolute neutral steering position, the left and right front wheels FW1 and FW2 must be steered to the front wheel neutral steering position that corresponds to the absolute neutral steering position of the left and right rear wheels RW1 and RW2. Steering the left and right front wheels FW1 and FW2 to the neutral steering position in this case is done by returning the operating position of the steering wheel 11 to the neutral position, or more specifically, making the steering angle θ zero. Therefore, steering the left and right rear wheels RW1 and RW2 to the absolute neutral steering position in this way makes it possible to correct the off-centerness of the steering wheel 11 so that the vehicle is able to travel in a straight line. Accordingly, the steering wheel 11 when the vehicle is traveling in a straight line can be returned to the neutral position that coincides with the senses of the driver, i.e., the off-centerness of the steering wheel can be corrected, so that it does not feel odd to the driver.

The invention is not limited to the example embodiment described above, but may be modified without departing from the scope thereof.

In the example embodiment described above, the controlled neutral steering position of the left and right rear wheels RW1 and RW2 is corrected to the absolute neutral steering position in order to correct the steering wheel 11, which is off-center, to the neutral position (i.e., the center). Accordingly, the direction in which the vehicle is traveling is aligned with the front-rear axial direction of the vehicle body and the off-centerness of the steering wheel 11 is corrected.

However, in the 4WS vehicle, even if the left and right rear wheels RW1 and RW2 are being steered due to a difference between the controlled neutral steering position and the absolute neutral steering position, the vehicle can still be driven in a straight line by steering the left and right front wheels FW1 and FW2 in accordance with the left and right rear wheels RW1 and RW2, as described above. Therefore, if the vehicular steering apparatus is provided with i) a variable gear ratio steering apparatus (so-called VGRS), in which the steering shaft 12 is divided into a steering wheel 11 side (i.e., a first shaft) and a left and right front wheel FW1 and FW2 side (i.e., a second shaft) and which is able to vary the steering angle of the left and right front wheels FW1 and FW2 with respect to the steering angle θ of the steering wheel 11, or ii) a steer-by-wire mechanism in which the steering wheel 11 is mechanically disconnected from the left and right front wheels FW1 and FW2, it is possible to return only the steering wheel 11 to the neutral position when it is determined that the vehicle is traveling in a straight line.

In a vehicular steering apparatus that is provided with this kind of variable gear ratio steering apparatus or steer-by-wire mechanism, the steering wheel 11 and the left and right front wheels FW1 and FW2 can be operated independently using actuators. Therefore, when correcting the off-centerness of the steering wheel 11, that correction can be made even if the vehicle is "crab-walking". Incidentally, in this case, even though strictly speaking the vehicle is traveling in a straight line while the front-rear axial direction of the vehicle is at a slight angle to the direction in which the vehicle is traveling, this angle is small compared to the steering angle θ according to the off-centerness of the steering wheel 11. Therefore, correcting this off-centerness of the steering wheel 11 will eliminate the odd sensation that the driver may otherwise feel.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the scope of the invention.

The invention claimed is:

1. A vehicular steering apparatus that includes a steering wheel which is operated by a driver, a front wheel steering mechanism which steers a front wheel in response to an operation of the steering wheel, and a rear wheel steering mechanism which steers a rear wheel in connection with the steering of the front wheel, the vehicular steering apparatus comprising:
a vehicle speed detecting portion that detects a speed of a vehicle;
an operating force detecting portion that detects operating force applied to the steering wheel;

a displacement amount detecting portion that detects an amount of displacement of the steering wheel;

a straight-line travel determining portion that determines that the vehicle is traveling in a straight line when a state in which i) the operating force detected by the operating force detecting portion is equal to or less than a predetermined operating force that is set in advance and ii) an amount of change in the amount of displacement detected by the displacement amount detecting portion is equal to or less than a predetermined amount of change that is set in advance, continues for a predetermined period of time that is set in advance or longer, when the vehicle speed detected by the vehicle speed detecting portion is equal to or greater than a predetermined vehicle speed that is set in advance;

an operating position determining portion that determines whether the operating position of the steering wheel that corresponds to the amount of displacement of the steering wheel detected by the displacement amount detecting portion is different than a neutral position of the steering wheel for aligning the direction in which the vehicle is traveling with the front-rear axial direction of a vehicle body such that the vehicle will travel in a straight line, when it is determined by the straight-line travel determining portion that the vehicle is traveling in a straight line; and an operating position correcting portion that corrects the operating position of the steering wheel to the neutral position when it is determined by the operating position determining portion that the operating position of the steering wheel is different than the neutral position.

2. The vehicular steering apparatus according to claim 1, wherein the rear wheel steering mechanism includes an actuator for steering the rear wheel, and a steering amount detecting portion that detects a relative steering amount of the rear wheel with respect to the vehicle body resulted from driving the actuator, and wherein the operating position correcting portion is constructed with i) a rear wheel steering amount calculating portion that calculates a steering amount of the rear wheel that matches the steering amount of the front wheel, using the amount of displacement of the steering wheel detected by the displacement amount detecting portion and a ratio between the amount of displacement of the steering wheel in the front wheel steering mechanism and the steering amount of the front wheel, and ii) an actuator operation controlling portion that operates the actuator, using the relative steering amount detected by the steering amount detecting portion, until the steering position of the rear wheel that corresponds to the steering amount calculated by the rear wheel steering amount calculating portion comes to match a neutral steering position for aligning the direction in which the vehicle is traveling with the front-rear axial direction of the vehicle body such that the vehicle travels in a straight line.

3. The vehicular steering apparatus according to claim 1, wherein a first shaft that is connected to the steering wheel is able to rotate relative to a second shaft that is connected to the front wheel steering mechanism; a front wheel steering actuator is provided which independently displaces the steering wheel with respect to the steering of the front wheel; and the operating position correcting portion corrects the operating position of the steering wheel to the neutral position by controlling the operation of the front wheel steering actuator when it is determined by the straight-line travel determining portion that the vehicle is traveling in a straight line and it is determined by the operating position determining portion that the operating position of the steering wheel is different than the neutral position.

4. A control method for a vehicular steering apparatus that includes a steering wheel which is operated by a driver, a front wheel steering mechanism which steers a front wheel in response to an operation of the steering wheel, and a rear wheel steering mechanism which steers a rear wheel in connection with the steering of the front wheel, the control method comprising:

detecting a speed of the vehicle;

detecting operating force applied to the steering wheel;

detecting an amount of displacement of the steering wheel;

determining that the vehicle is traveling in a straight line when a state in which i) the detected operating force is equal to or less than a predetermined operating force that is set in advance and ii) an amount of change in the detected amount of displacement is equal to or less than a predetermined amount of change that is set in advance, continues for a predetermined period of time that is set in advance or longer, when the detected vehicle speed is equal to or greater than a predetermined vehicle speed that is set in advance;

determining whether the operating position of the steering wheel that corresponds to the detected amount of displacement of the steering wheel is different than a neutral position of the steering wheel for aligning the direction in which the vehicle is traveling with the front-rear axial direction of a vehicle body such that the vehicle will travel in a straight line, when it is determined that the vehicle is traveling in a straight line; and correcting the operating position of the steering wheel to the neutral position when it is determined that the operating position of the steering wheel is different than the neutral position.

* * * * *